United States Patent [19]

Bishell et al.

[11] Patent Number: 4,848,597

[45] Date of Patent: Jul. 18, 1989

[54] GRANULAR MATERIAL DISPENSER

[76] Inventors: Calvin Bishell; Judy Bishell, both of Box 513, Veteran, Alberta, Canada, T0C 2S0

[21] Appl. No.: 148,862

[22] Filed: Jan. 27, 1988

[51] Int. Cl.$^4$ .......................... B67D 5/64; A01K 1/10
[52] U.S. Cl. .................................. 222/169; 222/614; 119/51 R
[58] Field of Search ............... 222/613, 169, 170, 623, 222/614, 172, 167; 119/51 R

[56] References Cited

U.S. PATENT DOCUMENTS

| | | | |
|---|---|---|---|
| 9,403 | 11/1852 | Gates | 222/169 |
| 353,359 | 11/1886 | Holland | 222/172 |
| 508,123 | 11/1893 | Sharp | 222/172 X |
| 986,018 | 3/1911 | Libner | 222/169 |
| 991,790 | 5/1911 | Lampke . | |
| 1,087,010 | 2/1914 | Gramling | 119/51 R |
| 1,823,392 | 9/1931 | Fillingim | 222/169 |
| 1,925,809 | 9/1933 | Masters . | |
| 2,654,510 | 10/1953 | Purvis | 222/614 X |

FOREIGN PATENT DOCUMENTS

| | | | |
|---|---|---|---|
| 3128066 | 2/1983 | Fed. Rep. of Germany | 119/51 R |
| 538475 | 1/1956 | Italy | 222/613 |
| 1166760 | 7/1985 | U.S.S.R. | 119/51 R |

OTHER PUBLICATIONS

Popular Mechanics, Nov. 1939, p. 788, Tumbling Barrel Mixes Feed.

Primary Examiner—Joseph J. Rolla
Assistant Examiner—Steven B. Parker
Attorney, Agent, or Firm—George H. Dunsmuir

[57] ABSTRACT

Granular cattle feed is normally dispensed manually using pails, sacks or open trucks, or from hoppers. Such methods are usually labor intensive, time consuming and wasteful of feed. A solution to the problem involves a large cylindrical drum having a diameter similar to a round bale, with a plurality of cleats extending across the cylindrical end of the drum between the circular sides thereof for causing the drum to rotate when in contact with the ground, and a large dispensing opening between an adjacent pair of cleats for dispensing elongated piles of feed at spaced apart locations along the path of travel of the drum. The device can be pivotally mounted on the rear end of a truck for movement between an elevated, transport position and a ground engaging, use position.

5 Claims, 1 Drawing Sheet

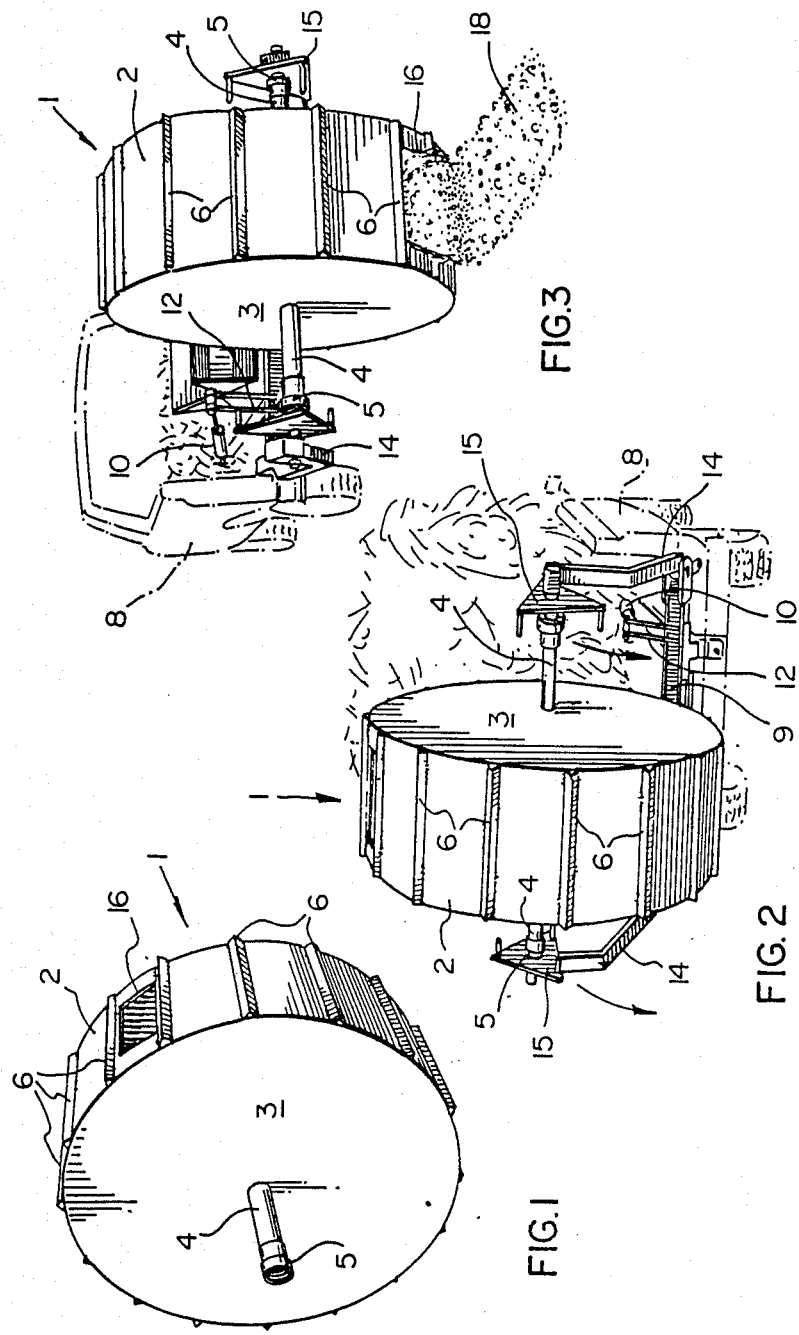

GRANULAR MATERIAL DISPENSER

BACKGROUND OF THE INVENTION

This invention relates to a device for dispensing granular material, and in particular to a cattle feed dispenser.

The device of the present invention is primarily intended for use in combination with a round bale handler. However, the device can be used alone for dispensing grain or pellets to livestock.

With the introduction of round bales for winter feeding of livestock and the increasing popularity of round bale handlers, it has become feasible to winter cattle large distances from farmyards. However, the remote feeding of cattle presents the problems of requiring a bale handler and a second machine or apparatus for transporting grain or pellets to the livestock. Solutions to the problem include the use of pails, sacks, hoppers or open trucks, all of which are labour intensive, time consuming and wasteful of feed. In approaching the problem, the present inventor sought a dispenser which could be operated by a single operator.

Dispensers of generally the type described above are disclosed for example in Canadian Pat. Nos. 54,002, issued to S. Hardley on Nov. 9, 1986 56,554, issued to A.W. Steeves on July 8, 1987; 116,274, issued to S.W. Farnham et al on Jan. 26, 1909 and 162,611 issued to H.T. French on May 11, 1915, and U.S. Pat. Nos. 677,612, issued to A.L. Alexander on July 2, 1901; 986,018, issued to N.N. Libner on Mar. 7, 1911; 991,790, issued to S.M. Dampke on May 9, 1911; 1,925,809, issued to E.L. Masters on Sept. 5, 1933 and 3,152,732, issued to L.H. Schulman et al on Oct. 13, 1964. In general, the patented devices are too complicated or ill adapted to large scale dispensing of granular feed. Many of the devices are provided with small openings or perforations which would merely deposit small quantities of granular feed in a plurality of spaced apart areas.

The object of the present invention is to overcome the above problems by providing a relatively simple device for dispensing granular material, and in particular granular feed in large quantities at spaced apart locations during travel along the ground.

SUMMARY OF THE INVENTION

Accordingly, the present invention relates to a device for dispensing granular material comprising hollow, cylindrical casing means, including a cylindrical end wall and circular side walls; axle means on each side wall, permitting rotatable mounting of the device on a carrying vehicle; spaced apart cleat means on said end wall extending between said side walls for facilitating rotation of said casing means when in a ground engaging position; and a dispensing opening in said end wall between an adjacent pair of cleat means for dispensing granular material during each rotation of the casing means.

DESCRIPTION OF THE DRAWINGS

The invention will now be described in greater detail with reference to the accompanying drawing, which illustrates a preferred embodiment of the invention, and wherein:

FIG. 1 is a perspective view of a dispensing device in accordance with the present invention;

FIG. 2 is a perspective view of the device of FIG. 1 mounted on the rear end of a truck in the elevated or transport position; and FIG. 3 is a perspective view of the device of FIGS. 1 and 2 mounted on the rear end of a truck in the dispensing or use position.

DESCRIPTION OF THE PREFERRED EMBODIMENT(S)

With reference to the drawing, the dispensing device of the present invention includes a cylindrical casing generally indicated at 1 defined by a cylindrical end wall 2, and a pair of circular side walls 3. An axle defined by a length of pipe 4 with a stepped sleeve 5 on the outer end thereof extends outwardly from the centre of each side wall 3. A plurality of transversely extending V-shaped cleats 6 are provided on the end wall 2, the cleats 6 extending between the side walls 3. The cleats 6 are spaced equidistant apart around the periphery of the end wall 2 for engaging the ground in the use position to cause the casing 1 to rotate. At least one baffle plate (not shown) can be provided on the interior of the casing 1. The baffle plate(s) would extend radially inwardly from the interior surface of the end wall 2 for mixing granular material, e.g. various feed grains or a grain and vitamin supplement.

With reference to FIGS. 2 and 3, the casing 1 is mounted on the rear end of a truck 8. For such purpose, a frame 9 is rotatably mounted on the rear end of the truck 8. The frame 9 is rotated by a pair of hydraulic cylinders 10, the piston rods of which are pivotally connected to the top ends of levers 12, which extend downwardly to the frame 9. A pair of arms 14 extend rearwardly from the ends of the frame 9 for rotatably supporting the axles 4. Actuation of the cylinders 10 causes rotation of the arms 14, and consequently of the casing 1 between the elevated, transport position (FIG. 2) and the use or dispensing position (FIG. 3).

Bale pick-ups 15 are provided on the outer, free ends of the arms 14. Stub axles (not shown) extend inwardly from the outer ends of the arms 14 for rotatable supporting the axles 4.

A rectangular opening 16 is provided between an adjacent pair of cleats 6. The opening 16 is large, occupying most of the area between the adjacent pair of cleats 6.

During use, the casing 1 is normally carried in the elevated transport position (FIG. 2) by the arms 14, with the opening 16 in the top of the casing. When the casing 1 is lowered into the ground engaging position (FIG. 3), the cleats 6 cause the casing to rotate. During each revolution of the casing 1, an elongated rectangular pile or mound 18 of granular material is dispensed through the opening 16. When the diameter of the casing 1 is the preferred size, namely the diameter of a round bale (five feet), the feed mounds 18 contain approximately five gallons of grain and are spaced approximately fifteen feet apart. The volume of the drum ensures that the loaded weight thereof is approximately the same as a densely packed round bale. Thus, the device can readily be used with a round bale handler, and when used on snow, the weight of the casing and its load packs the snow into a wide trough (preferably two feet).

While the drawing illustrates the use of the device on a truck mounted bale handler, it will be appreciated that the device can be used with other vehicles such as front end loader tractors. The device permits one operator to feed a large number of cattle, with very little manual labour in a short period of time. There is relatively little feed loss or dust when compared to open containers.

What we claim is:

1. A device for dispensing granular material, comprising:
   a) a generally cylindrical casing means;
   b) said casing means including a generally cylindrical side wall having a width defined by first and second edges;
   c) first and second generally circular end walls extending from said first and second edges, respectively;
   d) a plurality of spaced apart cleat means disposed on said side wall and extending from about said first edge to about said second edge thereof;
   e) at least one opening extending substantially across the width of said side wall immediately adjacent said first and second edges;
   f) said at least one opening being provided for freely pouring the granular material in the manner of a stream across the width thereof and extends substantially between two adjacent cleat means; and
   g) axle means disposed on each said first and second end walls for mounting the device on a carrying vehicle.

2. A dispensing device according to claim 1, wherein the diameter of said casing means is substantially equal to the diameter of a conventional round bale.

3. A dispensing device according to claim 1, wherein said axle means includes a pipe section extending outwardly from the centre of each said end wall.

4. The device of claim 1, wherein:
   a) each said cleat means extending substantially above the surface of said side wall.

5. The device of claim 1, wherein:
   a) each said cleat means including a generally V-shaped projection spaced equidistant apart on said side wall.

* * * * *